United States Patent
Yan

(10) Patent No.: US 9,537,837 B2
(45) Date of Patent: *Jan. 3, 2017

(54) METHOD FOR ENSURING MEDIA STREAM SECURITY IN IP MULTIMEDIA SUB-SYSTEM

(71) Applicant: Inventergy, Inc., Campbell, CA (US)

(72) Inventor: Jun Yan, Guangdong Province (CN)

(73) Assignee: INVENTERGY, INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/885,168

(22) Filed: Oct. 16, 2015

(65) Prior Publication Data

US 2016/0173459 A1    Jun. 16, 2016

Related U.S. Application Data

(63) Continuation of application No. 14/050,768, filed on Oct. 10, 2013, now Pat. No. 9,167,422, which is a (Continued)

(30) Foreign Application Priority Data

Jan. 7, 2005    (CN) .......................... 2005 1 0000097

(51) Int. Cl.
*H04N 7/167*     (2011.01)
*H04L 9/00*      (2006.01)
(Continued)

(52) U.S. Cl.
CPC ....... *H04L 63/0435* (2013.01); *G06Q 20/3829* (2013.01); *H04L 9/0838* (2013.01);
(Continued)

(58) Field of Classification Search
CPC .. H04L 63/0435; H04L 9/0838; H04L 9/0844; H04L 63/061; H04L 2209/56; H04L 2463/062; H04W 12/00; G06Q 20/3829
(Continued)

(56) References Cited

U.S. PATENT DOCUMENTS 4,423,287 A    12/1983  Zeidler
7,065,643 B1    6/2006  Cornils et al.
(Continued)

FOREIGN PATENT DOCUMENTS

CN    1406005    3/2003
EP    0669741    8/1995
(Continued)

OTHER PUBLICATIONS

Written Opinion issued in Corresponding PCT application, Dec. 31, 2005.

(Continued)

*Primary Examiner* — Aravind Moorthy
(74) *Attorney, Agent, or Firm* — Workman | Nydegger; Kirk Coombs

(57) ABSTRACT

A method for ensuring media stream security in an IP Multimedia Subsystem network is disclosed. The method includes: assigning an end-to-end media stream security key for a calling User Equipment (UE) or a called UE, by a network device with which the calling UE or the called UE is registered, respectively, and transmitting the media stream security key to a network device with which the opposite end is registered; encrypting the end-to-end media stream security key using a session key shared with the calling UE or the called UE respectively, and transmitting the encrypted end-to-end media stream security key to the calling UE or the called UE, respectively, via a session message; encrypting or decrypting a media stream, by the calling UE or the called (Continued)

UE, respectively, using the end-to-end media stream security key.

20 Claims, 3 Drawing Sheets

Related U.S. Application Data continuation of application No. 11/774,271, filed on Jul. 6, 2007, now Pat. No. 8,582,766, which is a continuation of application No. PCT/CN2005/002429, filed on Dec. 31, 2005.

(51) Int. Cl.
*H04L 9/08* (2006.01)
*H04L 29/06* (2006.01)
*G06Q 20/38* (2012.01)
*H04W 12/00* (2009.01)

(52) U.S. Cl.
CPC .......... *H04L 9/0844* (2013.01); *H04L 63/061* (2013.01); *H04W 12/00* (2013.01); *H04L 2209/56* (2013.01); *H04L 2463/062* (2013.01)

(58) Field of Classification Search
USPC .................. 713/153; 380/201, 239, 259, 284
See application file for complete search history.

(56) References Cited

U.S. PATENT DOCUMENTS

| | | | |
|---|---|---|---|
| 7,382,881 B2 | 6/2008 | Uusitalo et al. | |
| 7,574,735 B2 | 8/2009 | Pirttimaa et al. | |
| 7,660,417 B2 | 2/2010 | Blom et al. | |
| 7,676,041 B2 | 3/2010 | Horn et al. | |
| 8,582,766 B2 * | 11/2013 | Yan | G06Q 20/3829 380/247 |
| 9,167,422 B2 * | 10/2015 | Yan | G06Q 20/3829 |
| 2002/0025045 A1 | 2/2002 | Raike | |
| 2003/0154400 A1 | 8/2003 | Prittimaa et al. | |
| 2003/0159067 A1 | 8/2003 | Stirbu | |
| 2003/0200431 A1 | 10/2003 | Stirbu | |
| 2003/0200433 A1 | 10/2003 | Stirbu | |
| 2003/0212912 A1 | 11/2003 | Bajko et al. | |
| 2004/0210766 A1 | 10/2004 | Kroselberg | |
| 2005/0216763 A1 | 9/2005 | Lee et al. | |
| 2005/0238171 A1 | 10/2005 | Chen et al. | |
| 2005/0251681 A1 | 11/2005 | Robles et al. | |
| 2006/0079205 A1 | 4/2006 | Semple et al. | |
| 2007/0160201 A1 | 7/2007 | Blom et al. | |
| 2007/0294186 A1 | 12/2007 | Yan | |
| 2014/0169563 A1 | 6/2014 | Yan | |

FOREIGN PATENT DOCUMENTS

| | | |
|---|---|---|
| EP | 1253762 | 10/2002 |
| EP | 1835652 | 9/2007 |
| WO | WO 03049357 | 6/2003 |

OTHER PUBLICATIONS http://en.wikipedia.org/wiki/Function, Aug. 22, 2010.
Extended European Search Report cited in PCT/CN2005002429, Jan. 24, 2008.
Office Action cited in U.S. Appl. No. 11/774,271, dated Sep. 30, 2010.
Office Action cited in U.S. Appl. No. 11/774,271, dated Mar. 18, 2011.
Notice of Allowance cited in U.S. Appl. No. 11/774,271, dated Jul. 10, 2013.
Notice of Allowance cited in U.S. Appl. No. 14/050,768, dated Apr. 16, 2015.
Notice of Allowance cited in U.S. Appl. No. 14/050,768, dated Jun. 29, 2015.

* cited by examiner

METHOD FOR ENSURING MEDIA STREAM SECURITY IN IP MULTIMEDIA SUB-SYSTEM

CROSS-REFERENCE TO RELATED APPLICATIONS

This application is a continuation of U.S. patent application Ser. No. 14/050,768, filed Oct. 10, 2013, and entitled "METHOD FOR ENSURING MEDIA STREAM SECURITY IN IP MULTIMEDIA SUB-SYSTEM," which issued as U.S. Pat. No. 9,167,422 on Oct. 20, 2015, which is a continuation of U.S. patent application Ser. No. 11/774,271, filed Jul. 6, 2007, and entitled "METHOD FOR ENSURING MEDIA STREAM SECURITY IN IP MULTIMEDIA SUB-SYSTEM," which issued as U.S. Pat. No. 8,582,766 on Nov. 12, 2013, which is a continuation of PCT/CN2005/002429, filed Dec. 31, 2005, and entitled "A METHOD FOR ENSURING THE SAFETY OF THE MEDIA-FLOW IN IP MULTIMEDIA SUB-SYSTEM," and which published as WO/2006/072212 on Jul. 13, 2006, and which claims priority to CN 200510000097.7, filed Jan. 7, 2005. The entire contents of each of the foregoing applications are expressly incorporated herein by reference in their entireties.

FIELD OF THE INVENTION

The present invention relates to the media stream security technologies in communication networks, and in particular, to a method for ensuring media stream security in an IP Multimedia Subsystem (IMS) network.

BACKGROUND OF THE INVENTION

As a core session control layer in the fixed and mobile networks, the IMS has become a main topic in the art. Many specifications related to the IMS have been defined in the Third Generation Partnership Project (3GPP) and Telecommunications and Internet Converged Services and Protocols for Advanced Networking (TISPAN) standards, which concerns network architecture, interface, protocol, etc. Particularly, security is an important consideration in the 3GPP and TISPAN. In the current specifications, the IMS network is split into an access domain and a network domain in view of the security, and security specifications are defined for the access domain and the network domain respectively. FIG. 1 shows a security model for the IMS network, in which interfaces requiring the security are defined. Although having been described in detail in the specifications, these interfaces are defined only in terms of the control plane of the IMS network, i.e. how to ensure the security of the session protocols in the IMS network, instead of how to ensure the security of the media plane in the IMS network. In fact, the security of the media plane is also very important. Otherwise, media streams may be tampered or eavesdropped during the conversation of the subscribers, which results in degradation of the quality of service for the subscribers or leakage of confidential information.

Usually, an approach for protecting the media streams in the IMS network comprises: a Real-time Transfer Protocol (RTP) proxy is introduced into the architecture of the IMS network; keys are shared between User Equipment (UE) and the RTP proxy through the Generic Bootstrapping Architecture (GBA, which is also a generic authentication and key assignment model defined in the 3GPP specifications); confidentiality and integrity of the media streams are secured between the UE and the RTP proxy through the shared keys, achieving the security of the media streams in the access domain; and the security of the media streams in the network domain may be achieved in two ways: the first one is that no protection is provided between the RTP proxies, if the network is trustable or secure in the network domain; and the other one is that the media streams between the RTP proxies are protected through the IP_Security (IPSec) Encapsulating Security Payload (ESP) protocol under the security mechanism in the 3GPP IMS network domain.

FIG. 2 shows an architecture of the GBA model and FIG. 3 illustrates an application of the GBA model to key assignment for the media streams. In the application, the Session Initiation Protocol (SIP) server (such as Proxy Call Session Control Function (P-CSCF) defined in the 3GPP IMS network) and the RTP proxy are taken as a whole, i.e. a Network Application Function (NAF) entity in the GBA. The SIP server acquires from the Bootstrapping Server Function (BSF) a key shared between the NAF and an SIP client The key shared between the NAF and an SIP client is stored in the BSF. The SIP server then sends the key to the RTP proxy via Is interface. Thus, the key for media stream security is shared between the. SIP client and the RTP proxy.

In the GBA model, both the NAF and the BSF are logical function entities. All Application Servers (ASs) and even the Call Session Control Function (CSCF) entity may be used as an NAF to acquire a key shared with the UE in the GBA processes. Likewise, the BSF may be implemented by any device, such as a CSCF entity, a Home Subscriber Server (HSS), an Authentication, Authorization and Accounting (AAA) server, and a web portal, etc.

SUMMARY OF THE INVENTION

Embodiments of the invention provide a method for enhancing end-to-end media stream security in an IMS network, thereby solving the problem that the security and the quality of service for an end-to-end media stream are impaired as a result of many times of encryption and decryption required for the media stream.

The embodiments of the invention provide the following technical solutions.

A method for ensuring media stream security in an IP Multimedia Subsystem network, including the following steps:

assigning, by a first network device of a first User Equipment; UE, an end-to-end media stream security key for the first UE, and transmitting the end-to-end media stream security key to a second network device of a second UE;

encrypting the end-to-end media stream security key using a first session key shared with the first UE, and transmitting the encrypted end-to-end media stream security key to the first UE via a first session message; encrypting the end-to-end media stream security key using a second session key shared with the second UE, and transmitting the encrypted end-to-end media stream security key to the second UE via a second session message;

encrypting or decrypting a media stream, by at least one of the first UE or the second UE, using the end-to-end media stream security key.

Optionally, the first UE is a calling UE, the second UE is a called UE; or the first UE is a called UE, the second UE is a calling UE.

The first network device may be a Service-Call Session Control Function, S-CSCF, of the first UE, the end-to-end media stream security key is transmitted by the first network device to a Proxy-Call Session Control Function, P-CSCF, of the first UE, and is encrypted and transmitted to the first UE by the P-CSCF of the first UE, the second network device may be an S-CSCF of the second UE, the end-to-end media stream security key is transmitted by the second network device to a P-CSCF of the second UE, and is encrypted and transmitted to the second UE by the P-CSCF of the second UE.

Alternatively, the first network device may be an Application Sewer, AS, of the first UE, the end-to-end media stream security key is encrypted and transmitted to the first UE by the AS of the first UE, the second network device may be an AS of the second UE, the end-to-end media stream security key is encrypted and transmitted to the second UE by the AS of the second UE.

The method may also include: specifying a media stream security capability between the first UE and the second UE by the first network device or the second network device according to security capabilities provided by the first UE and the second UE.

The method may also include: transmitting the assigned end-to-end media stream security key by the first network device or the second network device to a listening device listening to the encrypted media stream by decrypting the media stream using the end-to-end media stream security key.

The media stream security key is transmitted between the first network device and the second network device, in plain text in a session message in a network domain, or through a security mechanism in the IMS network domain.

The end-to-end media stream security key may be a cipher key or an integrity key.

Another embodiment of the invention provides a system for ensuring media stream security in an IP Multimedia Subsystem network, including: a first network device of a first User Equipment, hereinafter referred to as UE, for assigning an end-to-end media stream security key for the first UE, transmitting the media stream security key to a second network device of a second UE, encrypting the end-to-end media stream security key using a first session key shared with the first UE, and transmitting the encrypted end-to-end media stream security key to the first UE via a first session message; and a second network device of the second UE, for encrypting the end-to-end media stream security key using a second session key shared with the second UE, and transmitting the encrypted end-to-end media stream security key to the second UE via a second session message.

Yet another embodiment of the invention provides a system for ensuring media stream security in an IP Multimedia Subsystem network, including: a first network device of a first User Equipment, hereinafter referred to as UE, for assigning an end-to-end media stream security key for the first UE, and transmitting the media stream security key to a second network device of a second UE; a third network device of the first UE, for encrypting the end-to-end media stream security key using a first session key shared with the first UE, and transmitting the encrypted end-to-end media stream security key to the first UE via a first session message; and a fourth network device of the second UE, for encrypting the end-to-end media stream security key using a second session key shared with the second UE, and transmitting the encrypted end-to-end media stream security key to the second UE via a second session message.

In the method according to an embodiment of the invention, the media stream security key is assigned for the calling UE and the called UE by an application server acting as a network device, or a network device such as a CSCF, etc. The media stream needs to be encrypted or decrypted only once by the calling UE or called UE during the transmission of the media stream. Therefore, there is no substantial affect on the performance of the IMS network device, and the quality of service for the media stream can be ensured easily. In terms of security, a key becomes invalid upon completion of the session because the key is assigned dynamically during each session. In this way, a very high security may be ensured.

Because the security capabilities of the calling UE and the called UE may be negotiated in an interactive way while negotiating the media stream security key, an end-to-end security association may be established dynamically between the calling UE and the called UE.

DETAILED DESCRIPTION OF THE EMBODIMENTS

Figure 1:
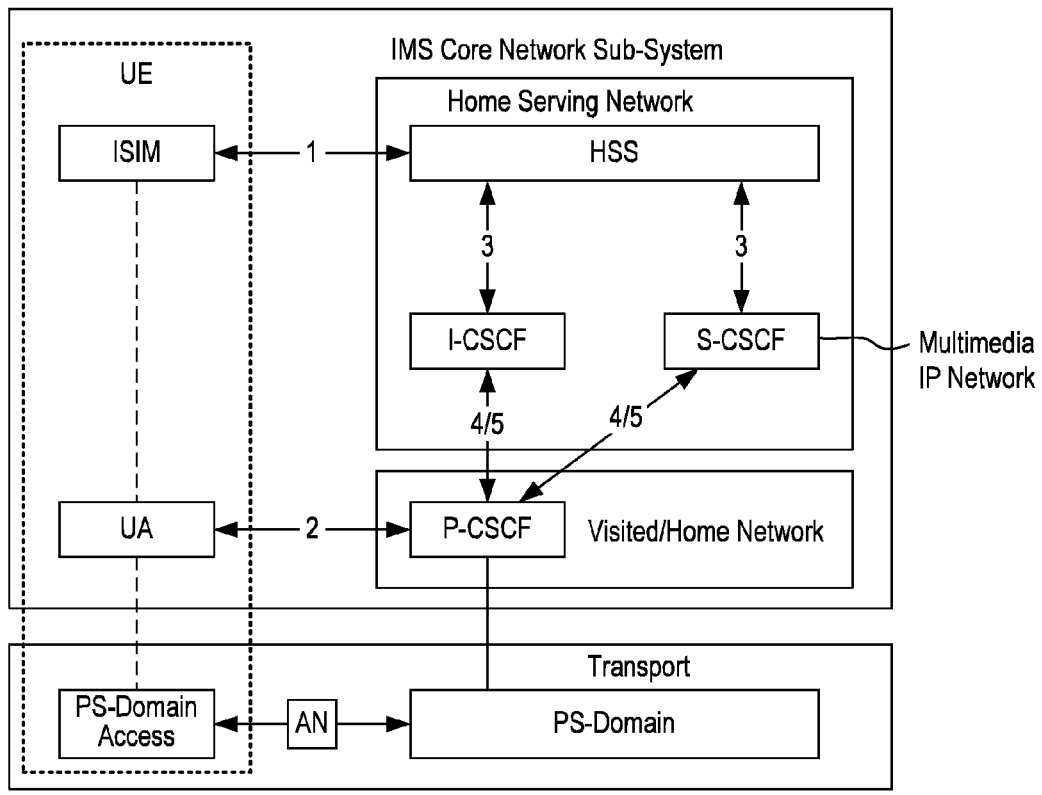
FIG. 1 is a schematic diagram illustrating an IMS network security model in the related art.
Figure 2:
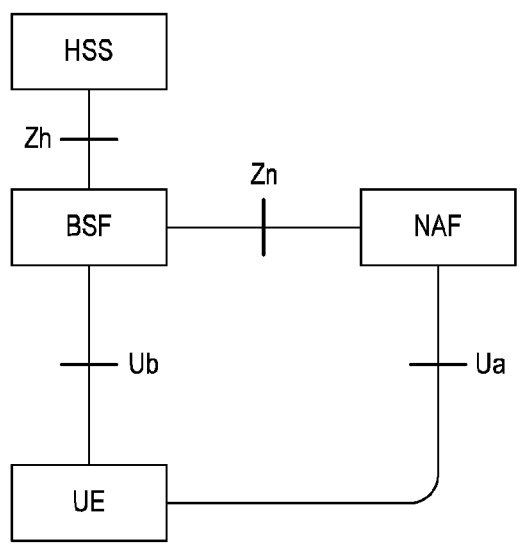
FIG. 2 is a schematic diagram illustrating a GBA model in the related art.
Figure 3:
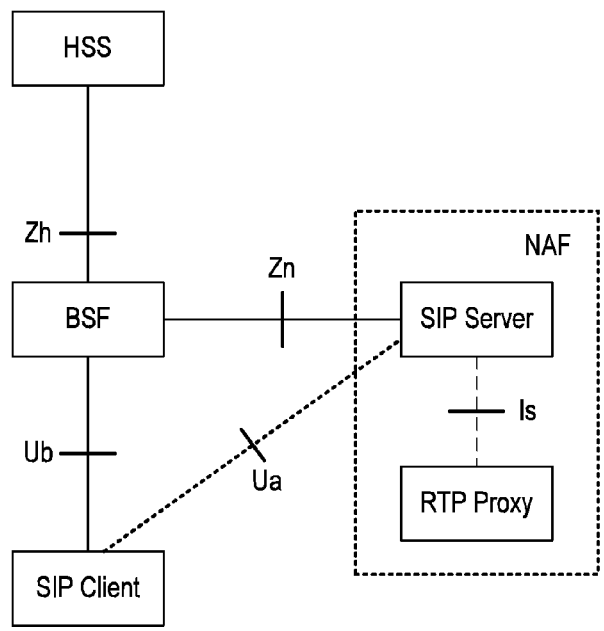
FIG. 3 illustrates an application of the GBA in media stream security.

In FIG. 1, the Call Session Control Function (CSCF) entities defined in the IMS network are operable to implement functions such as controlling, routing, etc. during call and session. Proxy-Call Session Control Function (P-CSCF), Service-Call Session Control Function (S-CSCF) and Interrogating-Call Session Control Function (I-CSCF) are distinguished from one another for the purpose of implementing different functions. Particularly, the Proxy-Call Session Control Function (P-CSCF) is used for access of a User Equipment (UE), all UEs access the network via the P-CSCF; the Service-Call Session Control Function (S-CSCF) provides the core functions, such as session controlling, routing, etc.; and the Interrogating-Call Session Control Function (I-CSCF) is used for selection of S-CSCF and intercommunications among different operators or the networks at different regions, as well as network shielding function and the like. For example, the I-CSCF may be used as the only egress for different operators. The Application Server (AS) in the IMS network provides services for users, for example, various applications such as call waiting, conference, instant message, etc. Different applications may be located in different ASs. The S-CSCF entity is responsible for forwarding a session request from a user to different ASs, depending on different services info.

In an embodiment of the invention, to reduce the times of encryption and decryption on the media stream during transmission, a security association is established directly between the Session Initiation Protocol (SIP) client, i.e. the calling UE, and the called UE, such that the media stream is protected through a direct encryption and decryption between the calling UE and the called UE, thus achieving the end-to-end media stream security.

An end-to-end media stream security key may be negotiated in two ways. The first one is that the end-to-end media stream security key is assigned by a CSCF entity. The second one is that the end-to-end media stream security key is assigned by an Application Server (AS). The end-to-end media stream security key is a Cipher Key (CK) or an Integrity Key (IK).

Figure 4:
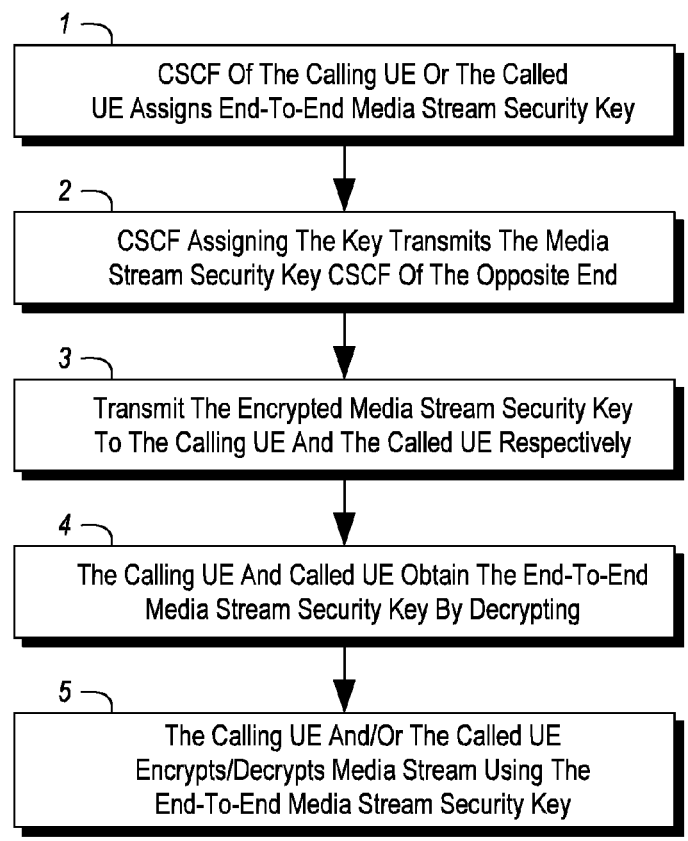
FIGS. 4 and 5 are flow charts illustrating embodiments of the invention.

Referring to FIG. 4, the end-to-end media stream security is implemented in the first way as follows.

Block 1: during the process of establishing a session, an S-CSCF among the CSCF entities with which the calling UE or the called UE is registered determines whether the media streams for this session need to be protected, according to subscription information of the UE, or an instruction from the AS regarding protection of the media stream in a session message. If protection is necessary, the S-CSCF assigns the end-to-end media security key according to the protection way specified in the subscription information. If the specified protection way is by encryption, an end-to-end Cipher Key (CK) is assigned. If the specified protection way is by integrity protection, an end-to-end Integrity Key (IK) is assigned.

Block 2: after assigning the end-to-end media stream security key, the S-CSCF of the calling UE or the called UE transmits the end-to-end media stream security key to an S-CSCF of the opposite UE in a session message of the network domain. The S-CSCF of the calling UE transmits the end-to-end media stream security key to the P-CSCF of the calling UE by using a session message, and the S-CSCF of the called UE transmits the end-to-end media stream security key to the P-CSCF of the called UE by using a session message.

If it is assumed to be trustable or secure in the network domain, the end-to-end media stream security key may be transmitted in plain text (i.e. the key is not protected by encryption at all). Practically, the end-to-end media stream security key may be transmitted through the security mechanism in the IMS network domain.

Block 3: the P-CSCF to which the calling UE or the called UE accesses encrypts the end-to-end media stream security key using a cipher key shared between the calling UE or called UE and the P-CSCF, the cipher key is obtained by the UE through negotiation during the process of registering Authentication and Key Agreement (AKA).

Block 4: the P-CSCF to which the calling UE access transmits the encrypted media stream security key to the calling UE in cipher text by using a session message, and the P-CSCF to which the called UE access transmits the encrypted media stream security key to the called UE in cipher text by using a session message, so as to ensure that the end-to-end media stream security key is transmitted securely in the insecure access-side network. Either of the calling UE or called UE obtains the end-to-end media stream security key between the calling UE and called UE by decrypting the encrypted media stream security key using the session key (i.e., the cipher key) shared with the P-CSCF.

Block 5: media stream messages are transmitted between the calling UE and the called UE after being encrypted or integrity-protected using the end-to-end media stream security key according to the Security Association (SA) negotiated during the process of establishing the session, thus achieving the end-to-end media stream security.

If only the media stream from the calling UE to the called UE needs to be protected, the calling UE encrypts or integrity-protects the media stream using the end-to-end media stream security key before sending the media stream to the called UE, while the called UE authenticates and decrypts the received media stream using the end-to-end media stream security key, and does not encrypt the media stream to be sent. If only the media stream from the called UE to the calling UE needs to be protected, the process is similar as the above. If both the media streams sent by the calling UE and the called UE need to be protected, both of the two parties encrypt or integrity-protect the media streams using the end-to-end media stream security key before sending the media streams, and decrypt the received media streams using the end-to-end media stream security key.

Figure 5:
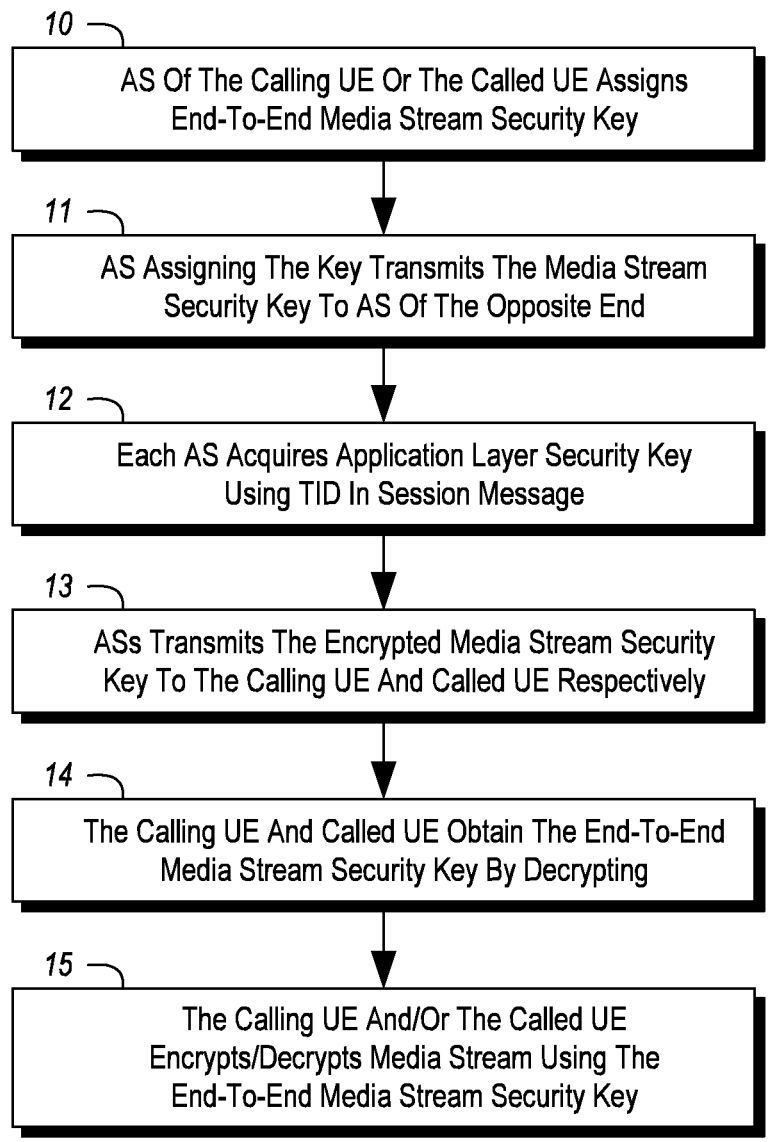

Referring to FIG. 5, the end-to-end media stream security is implemented in the second way as follows.

Before initiating a session, each of the calling UE and called UE negotiates a security key to be shared between each of the calling UE and the called UE and Network Application Function (NAF) during the process of registering and authenticating AKA, in combination with the GBA procedures. When initiating or responding to a session request subsequently, the calling UE or the called UE carries a Bootstrapping procedure Transaction identifier (B-TID) in a session message or during interaction with the NAF (alternatively, an application layer security key may be negotiated between the UE and NAF in another way, the detailed description of which is not limited to the above).

Block 10: during the process of establishing a session, an Application Server (AS) of the calling UE or the called UE determines whether the media streams for this session need to be protected, according to a requirement of the service or the subscription information of the user. If the protection is needed, the AS assigns the end-to-end media security key according to the protection way specified in the subscription information or the requirement of the service. If the specified protection way is by encryption, the end-to-end Cipher Key (CK) is assigned. If the specified protection way is by integrity protection, the end-to-end Integrity Key (IK) is assigned.

Block 11: the AS assigning the end-to-end media stream security key encrypts the end-to-end media stream security key through the security mechanism in the network domain and transmits the encrypted media stream security key by using a session message to an AS of the opposite UE.

If the network domain is assumed to be trustable, the key may be transmitted in plain text in the network domain.

Block 12: the AS of the calling UE requests an application layer security key shared between the NAF and the calling UE from the Bootstrapping Server Function (BSF) according to the Bootstrapping procedure Transaction identifier (B-TID) carried in the session message from the calling UE, the AS of the called UE requests an application layer security key shared between the NAF and the called UE from the Bootstrapping Server Function (BSF) according to the Bootstrapping procedure Transaction identifier (B-TID) carried in the session message from the called UE.

The application layer security key may also be stored in a Home Subscriber Server (HSS). In this case, the AS of either of the calling UE or the called UE acquires the key from the HSS according to the B-TID carried in the session message from the UE (practically, the application layer key may be assigned between the AS and the UE in other ways).

Block 13: the AS of the calling UE or the called UE encrypts media stream security key using the application layer security key shared with the UE, respectively, and transmits the encrypted media stream security key to the calling UE or the called UE via a session message, respectively.

Block 14: the calling UE or called UE obtains the end-to-end media stream security key between the calling UE and called UE by decrypting the encrypted media stream security key using the application layer key shared with the AS.

Block 15: media stream messages are transmitted between the calling UE and the called UE after being encrypted or integrity-protected using the end-to-end media stream security key according to the Security Association (SA) negotiated during the process of establishing the session, thus achieving the end-to-end media stream security.

If only the media stream from the calling UE to the called UE needs to be protected, the calling UE encrypts or integrity-protects the media stream using the end-to-end media stream security key before sending the media stream to the called UE, while the called UE authenticates and decrypts the received media stream using the end-to-end media stream security key and does not encrypt the media stream to be sent. If only the media stream from the called UE to the calling UE needs to be protected, the process is similar as the above. If both the media streams sent by the calling UE and the called UE need to be protected, both of the two parties encrypt or integrity-protect the media streams using the end-to-end media stream security key before sending the media streams, and decrypt the received media stream using the end-to-end media stream security key.

In block 12, the application layer security key shared between an Application Server (AS) and a User Equipment (UE) may be acquired in another way in related art.

For the format of a media stream message after being encrypted or integrity-protected, reference may be made to the definition of the format of RTP message in the Draft "Security RTP" of the IETF. Such a message format is substantially the similar as the format of RTP message, and defines information such as message to be encrypted, message to be authenticated, and locations of the encryption and authentication information in message, etc.

While negotiating the end-to-end media stream security key during the process of establishing a session, the security capabilities of the calling UE and the called UE may be negotiated in an interactive way, for example, information such as the supported algorithm for encryption or integrity protection, etc. The procedure and mechanism are similar to those described in the RFC 3329 Security Mechanism Agreement for the Session Initiation Protocol (SIP). While determining whether the media stream needs to be protected and assigning a security key, the AS or S-CSCF may specify the media stream capability between the calling UE and the called UE according to the security capabilities submitted by the calling UE and the called UE, thus establishing an end-to-end security association between the calling UE and the called UE.

The media stream is encrypted on an end-to-end basis during transmission. However, the end-to-end media stream security key is assigned by the AS or S-CSCF, thus, when the encrypted media stream transmitted needs to be listened to, the AS or S-CSCF may route the session, passing through a listening device, to the called UE while assigning the end-to-end media stream security key, so that the media stream of user is relayed to the listening device. The AS or S-CSCF send the Cipher Key (CK) to the listening device during the process of exchanging session messages with the listening device, so that the listening device may listen to the encrypted media stream by decrypting the media stream.

It is apparent to those skilled in the art that various modifications and variations may be made to the invention without departing from the spirit and scope of the invention. Therefore, such modifications and variations are intended to be encompassed in the invention provided that they fall into the scope of the invention as defined by the appended claims and their equivalents.

What is claimed:

1. A computer system, comprising:
one or more processors; and
one or more computer-readable media having stored thereon computer-executable instructions that are executable by the one or more processors to configure the computer system as a first network device serving first User Equipment (UE) and for ensuring media stream security between the first UE and second UE within a multimedia network, the computer-executable instructions including instructions that that are executable to configure the computer system to perform at least the following:
assign an end-to-end media stream security key for the first UE;
transmit the end-to-end media stream security key to a second network device serving second UE;
encrypt the end-to-end media stream security key using a first session key shared with the first UE resulting in a first encrypted end-to-end media stream security key; and
transmit the first encrypted end-to-end media stream security key to the first UE via a first session message,
wherein the first UE encrypts or decrypts a media stream using the end-to-end media stream security key, and wherein the second UE also encrypts or decrypts the media stream using the end-to-end media stream security key, the end-to-end media stream security key having been received by the second UE based on the second network device having encrypted the end-to-end media stream security key using a second session key shared between the second network device and the second UE, resulting in a second encrypted end-to-end media stream security key, and the second network device having transmitted the second encrypted end-to-end media stream security key to the second UE via a second session message.

2. The computer system of claim 1, wherein the first network device and the second network device comprise one or more application servers.

3. The computer system of claim 1, wherein the first network device and the second network device comprise one or more proxy devices.

4. The computer system of claim 3, wherein the one or more proxy devices are selected from the group comprising: one or more Proxy-Call Session Control Function entities and one or more Real-time Transfer Protocol proxy entities.

5. The computer system of claim 1, wherein the first network device comprises a first Service-Call Session Control Function (S-CSCF) entity serving the first UE and a first Proxy-Call Session Control Function (P-CSCF) entity serving the first UE, and wherein the second network device comprises a second S-CSCF entity serving the second UE, and a second P-CSCF entity serving the second UE.

6. The computer system of claim 1, the computer-executable instructions also including instructions that that are executable to configure the computer system to determine that the media stream is to be protected by way of encryption, and wherein assigning the end-to-end media stream security key comprises assigning an end-to-end Cipher Key.

7. The computer system of claim 1, the computer-executable instructions also including instructions that that are executable to configure the computer system to determine that the media stream is to be protected by way of integrity protection, and wherein assigning the end-to-end media stream security key comprises assigning an end-to-end Integrity Key.

8. The computer system of claim 1, wherein the multimedia network comprises an IP Multimedia Subsystems network.

9. The computer system of claim 1, wherein the multimedia network comprises a Voice over IP network.

10. A computer system, comprising:
one or more processors; and
one or more one or more computer-readable media having stored thereon computer-executable instructions that are executable by the one or more processors to configure the computer system as a second network device serving second User Equipment (UE) and for ensuring media stream security between first UE that is associated with a first network device and the second UE within a multimedia network, the computer-executable instructions including instructions that that are executable to configure the computer system to perform at least the following:
receive an end-to-end media stream security key from the first network device serving the first UE, the end-to-end media stream security key having been assigned for the first UE by the first network device, having been encrypted by the first network device using a first session key shared with the first UE, and having been sent by the first network device to the first UE in a first encrypted form via a first session message;
encrypt the end-to-end media stream security key using a second session key shared with the second UE; and
transmit the end-to-end media stream security key to the second UE in a second encrypted form via a second session message,
wherein the second UE encrypts or decrypts a media stream using the end-to-end media stream security key, and wherein the first UE also encrypts or decrypts the media stream using the end-to-end media stream security key.

11. The computer system of claim 10, wherein the first network device and the second network device comprise one or more application servers.

12. The computer system of claim 10, wherein the first network device and the second network device comprise one or more proxy devices.

13. The computer system of claim 12, wherein the one or more proxy devices are selected from the group comprising: one or more Proxy-Call Session Control Function entities and one or more Real-time Transfer Protocol proxy entities.

14. The computer system of claim 10, wherein the first network device comprises a first Service-Call Session Control Function (S-CSCF) entity serving the first UE and a first Proxy-Call Session Control Function (P-CSCF) entity serving the first UE, and wherein the second network device comprises a second S-CSCF entity serving the second UE, and a second P-CSCF entity serving the second UE.

15. The computer system of claim 10, wherein the multimedia network comprises an IP Multimedia Subsystems network.

16. The computer system of claim 10, wherein the multimedia network comprises a Voice over IP network.

17. The computer system of claim 10, wherein the multimedia network comprises one or more IP Multimedia Subsystems components and one or more Voice over IP components.

18. The computer system of claim 10, wherein the first network device is also configured to determine that the end-to-end media stream security key for the first UE based on an instruction from an Application Server entity in the multimedia network.

19. The computer system of claim 10, wherein the first UE is a calling UE, and the second UE is a called UE.

20. A method, implemented at a computer system that includes one or more processors and that is configured as a first network device serving first User Equipment (UE), for ensuring media stream security between the first UE and second UE within a multimedia network, the method comprising:
assigning an end-to-end media stream security key for the first UE;
transmitting the end-to-end media stream security key to a second network device serving second UE;
encrypting the end-to-end media stream security key using a first session key shared with the first UE resulting in a first encrypted end-to-end media stream security key; and
transmitting the first encrypted end-to-end media stream security key to the first UE via a first session message,
wherein the first UE encrypts or decrypts a media stream using the end-to-end media stream security key, and wherein the second UE also encrypts or decrypts the media stream using the end-to-end media stream security key, the end-to-end media stream security key having been received by the second UE based on the second network device having encrypted the end-to-end media stream security key using a second session key shared between the second network device and the second UE, resulting in a second encrypted end-to-end media stream security key, and the second network device having transmitted the second encrypted end-to-end media stream security key to the second UE via a second session message.

* * * * *